(12) United States Patent
Webb

(10) Patent No.: US 6,853,360 B1
(45) Date of Patent: Feb. 8, 2005

(54) ELECTRODE STRUCTURE FOR LIQUID CRYSTAL DISPLAY

(76) Inventor: Homer L. Webb, 5217 Old Spice Wood Springs Rd., Suite 2114, Austin, TX (US) 78731

( * ) Notice: Subject to any disclaimer, the term of this patent is extended or adjusted under 35 U.S.C. 154(b) by 0 days.

(21) Appl. No.: 09/559,034

(22) Filed: Apr. 27, 2000

Related U.S. Application Data

(60) Provisional application No. 60/132,344, filed on May 4, 1999.

(51) Int. Cl.[7] .............................. G09G 3/34; G09G 3/36
(52) U.S. Cl. ........................ 345/87; 345/103; 345/107; 345/694
(58) Field of Search .............................. 349/139–148, 349/107; 345/694, 695, 697, 97

(56) References Cited

U.S. PATENT DOCUMENTS

| | | | | |
|---|---|---|---|---|
| 4,484,219 A | * | 11/1984 | Kirk | 358/90 |
| 4,655,897 A | * | 4/1987 | DiSanto et al. | 359/296 |
| 5,041,824 A | * | 8/1991 | DiSanto et al. | 340/787 |
| 5,229,873 A | * | 7/1993 | Hirose et al. | 359/55 |
| 5,365,284 A | * | 11/1994 | Matsumoto et al. | 345/99 |
| 5,434,690 A | * | 7/1995 | Hisatake et al. | 349/143 |
| 5,657,039 A | * | 8/1997 | Mizukata et al. | 345/95 |
| 5,708,525 A | * | 1/1998 | Sheridon | 345/107 |
| 6,100,950 A | * | 8/2000 | Tanaka | 349/47 |
| 6,295,044 B1 | * | 9/2001 | Geisow et al. | 345/97 |
| 2002/0089633 A1 | * | 7/2002 | Von Gutfeld et al. | 349/143 |

* cited by examiner

*Primary Examiner*—Kent Chang
*Assistant Examiner*—David L Lewis
(74) *Attorney, Agent, or Firm*—Raymond Sun

(57) ABSTRACT

A selectively apertured, non-transparent and electrically conductive electrode structure to reduce the electrical sheet resistivity and extraneous optical transmission for an information display device. A higher contrast ratio is achieved by improved isolation of adjacent display locations composed from the apertured non-transparent electrode structure. Alternative electrode structures may be obtained having a variety of aperture dimensions and enumerations at display locations. For example, selectively apertured metal electrodes including meshed or perforated electrodes obviate the need for generally expensive optically transparent semiconductor metal oxides and alike and lower the manufacturing costs. Further, the display architecture employing the present electrode structure possess favorable characteristics such as robustness and faster switching response due to reduction of display element area resulting in less capacitance. The disclosed electrode structure is particularly suitable for large display surface area applications.

11 Claims, 3 Drawing Sheets

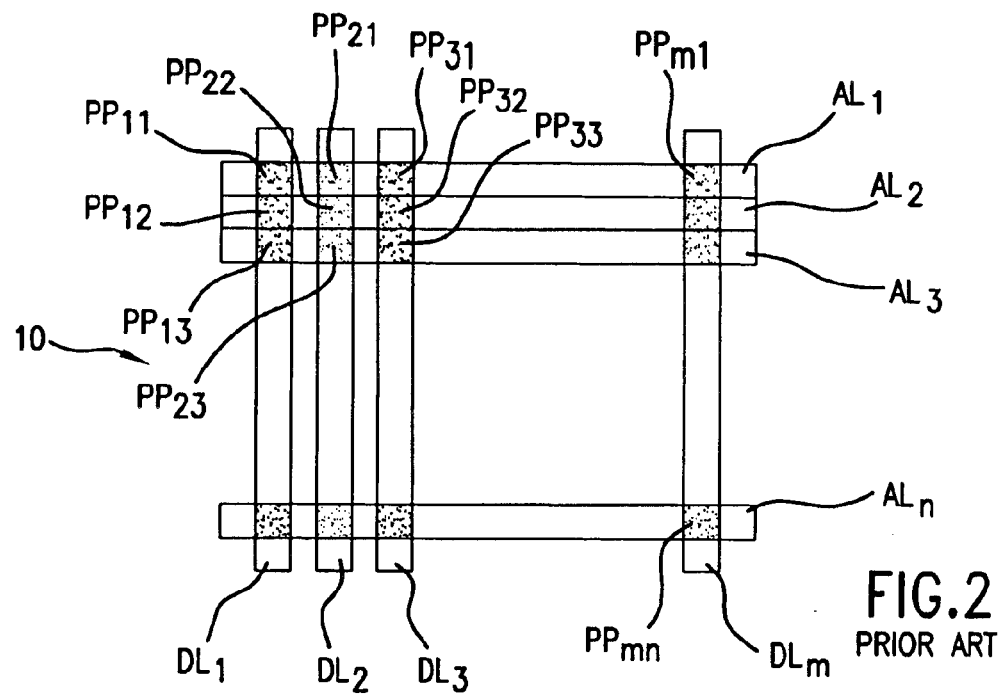
FIG.2 PRIOR ART
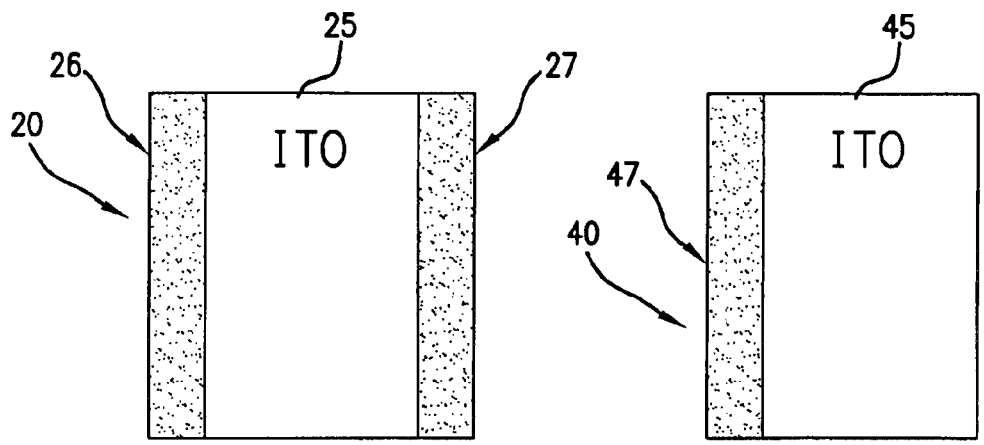
FIG.3A PRIOR ART
FIG.4A PRIOR ART
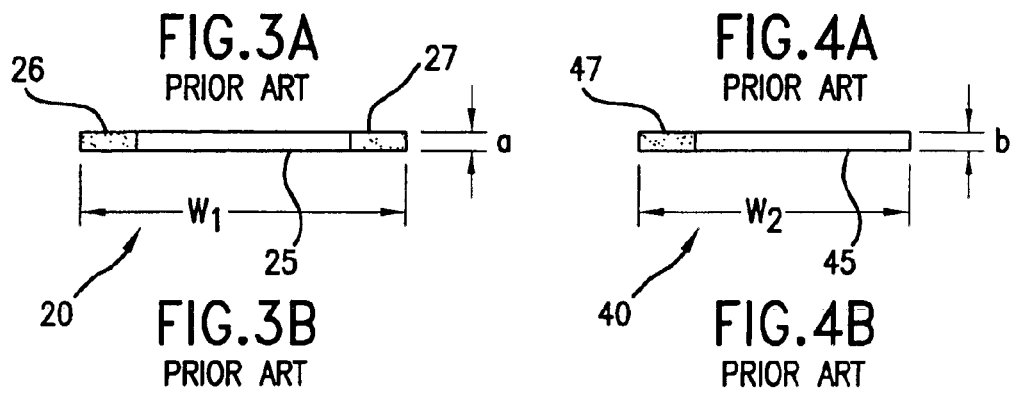
FIG.3B PRIOR ART
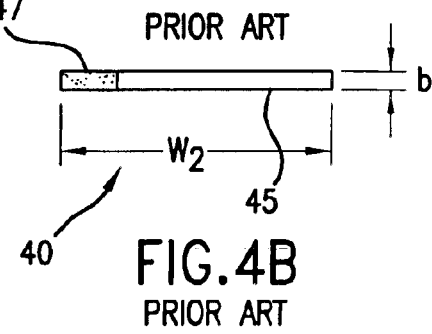
FIG.4B PRIOR ART

ELECTRODE STRUCTURE FOR LIQUID CRYSTAL DISPLAY

The present application is a continuation of provisional patent application Serial No. 60/132,344, entitled Electrode Structure for Liquid Crystal Display, inventor Homer Webb, filed May 4, 1999, which prior application is herby incorporated by reference.

TECHNICAL FIELD

The present invention relates to the field of information displays and, in particular, to electrode structures for liquid crystal display (LCD) flat panels.

BACKGROUND OF THE INVENTION

A variety of applications exist for LCDs including flat panels, televisions, computers, and cameras. The development of a large, viable flat panel display technology and other related display technologies has been inhibited by the scarcity of suitable materials that exhibit optical transparency and electrical conductivity. A matrix LCD typically includes overlapping row and column electrodes that roughly define display elements that may respond to an applied bias. The row and column electrodes are generally positioned on opposite sides of a layer of liquid crystal material. Where row and column electrodes overlap, display elements are formed. The electro-optic material which forms the liquid crystal layer generally responds to a change in the value of an RMS voltage applied across the display element to provide a corresponding change in the amount of transmitted light. In popular passive displays, use of a super-twisted neumatic (STN) type of liquid crystal as an electro-optic material is common. Traditionally, thin layers of metal or metal oxide have been etched on an optically transparent substrate such as glass, for example, to form substantially transparent electrode structures. However, such designs and materials suffer from numerous shortcomings in optical and electrical characteristics. For example, commonly employed optically transparent metal oxide layers suffer from relatively high electrical sheet resistivity, limited current handling capacity and brittleness. Furthermore, manufacturing such oxide layers is relatively complex, requiring the use of elaborate fabrication techniques including laser etching and chemical vapor deposition resulting in a high cost of production. Similarly, in the case of conductive metal layers, optical transmissive loss has been inherent to known prior art techniques. Increased transmittance has been generally achieved by use of relatively thinner metal or metal oxide films or layers. Such thin films or layers, however, possess increased electrical sheet resistance and decreased current handling capacity, resulting in slower switching response in display device applications. Moreover, metal layers may exhibit pernicious reactions with electro-optic materials during operation of the display device leading to shortened lifetimes;

Display element capacitance is another significant parameter of the LCD electrode structure. The display element capacitance is a function of many variables including spacing between the crossover or overlap of the row and column electrodes, the properties of the dielectric material between the electrodes and the area of the electrodes at their intersection. The larger the size of the display element formed by the overlap area at the electrode intersection the bigger the display element capacitance since it is directly proportional to the overlap area. For the present description, with respect to the electrodes, "overlap" refers to being oriented in a manner that they are superimposed with the liquid crystal display material disposed between them.

The amount of time required for an electrode to reach an applied voltage is a function of the electrode resistance and the capacitance. The larger the capacitance and/or the resistance, the more time is required for the electrode and, consequently, the addressed display element to reach the applied voltage which corresponds to the data. High sheet resistivity of optically transparent and electrically conductive electrodes, capacitance associated with the display element, and significant loss of light through the electrode structures utilized in present passive matrix displays all make it difficult to manufacture large display area display panels.

Recently, numerous approaches and a variety of electrode structures using various metals and semiconductor oxides have been attempted. For example, U.S. Pat. No. 5,852,486 to Hoke purportedly uses vertical barrier members within the liquid crystal display rather than electrodes resident on substrates. Although electrode structures used by Hoke purportedly have increased stability and improved visual appearance, the Hoke electrode structure employs complex manufacturing process. The LCD material is to be encapsulated between substrates and vertical barrier members.

U.S. Pat. No. 5,556,530 to Finkelstein et al. discloses an array of electrodes purportedly employing electron emitters for use in large flat panel displays. However, inherent emitter design problems associated with emission electrodes potentially limits acceptance. U.S. Pat. No. 5,293,546 to Tadros et al. describes an electrode structure which purportedly uses a working electrode comprising a transparent metal grid with metal oxide coating in conjunction with a display device.

The novel electrode structure of the present invention mitigates several LCD performance limitations encountered in the electrode structures of the prior art.

SUMMARY OF THE INVENTION

An object of the present invention is to reduce optical transmission loss in passive liquid crystal displays.

Another object of the present invention is to lower the electrical sheet resistivity of electrode structures.

A further object of the present invention is to improve the electrical conductivity of electrode structures.

Yet another object of the invention is to improve switching response and contrast ratio in passive liquid crystal displays.

A still further object of the invention is to produce flat panel displays efficiently, while decreasing the cost of manufacturing.

Still another object of the invention is to produce a display panel architecture with a thin design and light weight that minimizes or eliminates handling and shipping problems exhibited by large bulky projection and large screen CRT products yet allows for an efficient and a high performance display.

The display structure of the present invention includes parallel opposing major substrates. A predetermined pattern of apertured, conducting and non-transparent electrodes, preferably metal, are placed on inner surfaces of optically transparent parallel opposing substrates. Column electrodes are placed on one substrate, while row electrodes are placed on the other substrate. LCD media is disposed between the column electrode substrate and the row electrode substrate.

In a preferred embodiment of the present invention, an electrode structure is preferably comprised of an apertured metal electrode structure, rather than optically transparent and electrically conductive metal oxides such as those found in the prior art. Suitable metals for use in the present invention include gold, copper and platinum, with aluminum being most preferred due to its low weight and cost combined with high conductivity. In accordance with the present invention, the optically transparent substrates may be made of any material having satisfactory optical transparency in the desired spectral region.

In a preferred embodiment of the present invention, an LCD media is disposed between a sandwiched glass row and column substrates. The display architecture is comprised of a glass substrate having metal row electrodes apertured at display element locations and a second glass substrate having similarly apertured metal column electrodes.

In manufacture, such an electrode structure with increased electrical conductivity and optical transmissiveness combined with reduced electrical sheet resistivity and display element capacitance lends itself to solving many practical problems for large functional displays. Additional objects, advantages and novel features of the invention will become apparent from the drawings of the invention and detailed description which follows.

BRIEF DESCRIPTION OF THE DRAWINGS

FIG. 2 shows a plan view of a typical electrode structure of the display device known in the prior art, which employs optically transparent and electrically conductive (e.g. indium tin oxide, or ITO) electrodes.

FIG. 3A shows a plan view of an exemplar electrode of a typical electrode structure of the display device known in the prior art, which employs a combination of optically transparent and electrically conductive material and metal on both sides.

FIG. 3B shows a cross-sectional view of the exemplar electrode of the electrode structure of the display device of FIG. 3A.

FIG. 4A shows a plan view of another exemplar electrode of a typical electrode structure of the display device known in the prior art, which employs a combination of optically transparent and electrically conductive material and metal on one side.

FIG. 4B shows a cross-sectional view of the exemplar electrode of the electrode structure of the display device of FIG. 4A.

DETAILED DESCRIPTION OF THE PREFERRED EMBODIMENTS

Figure 1:
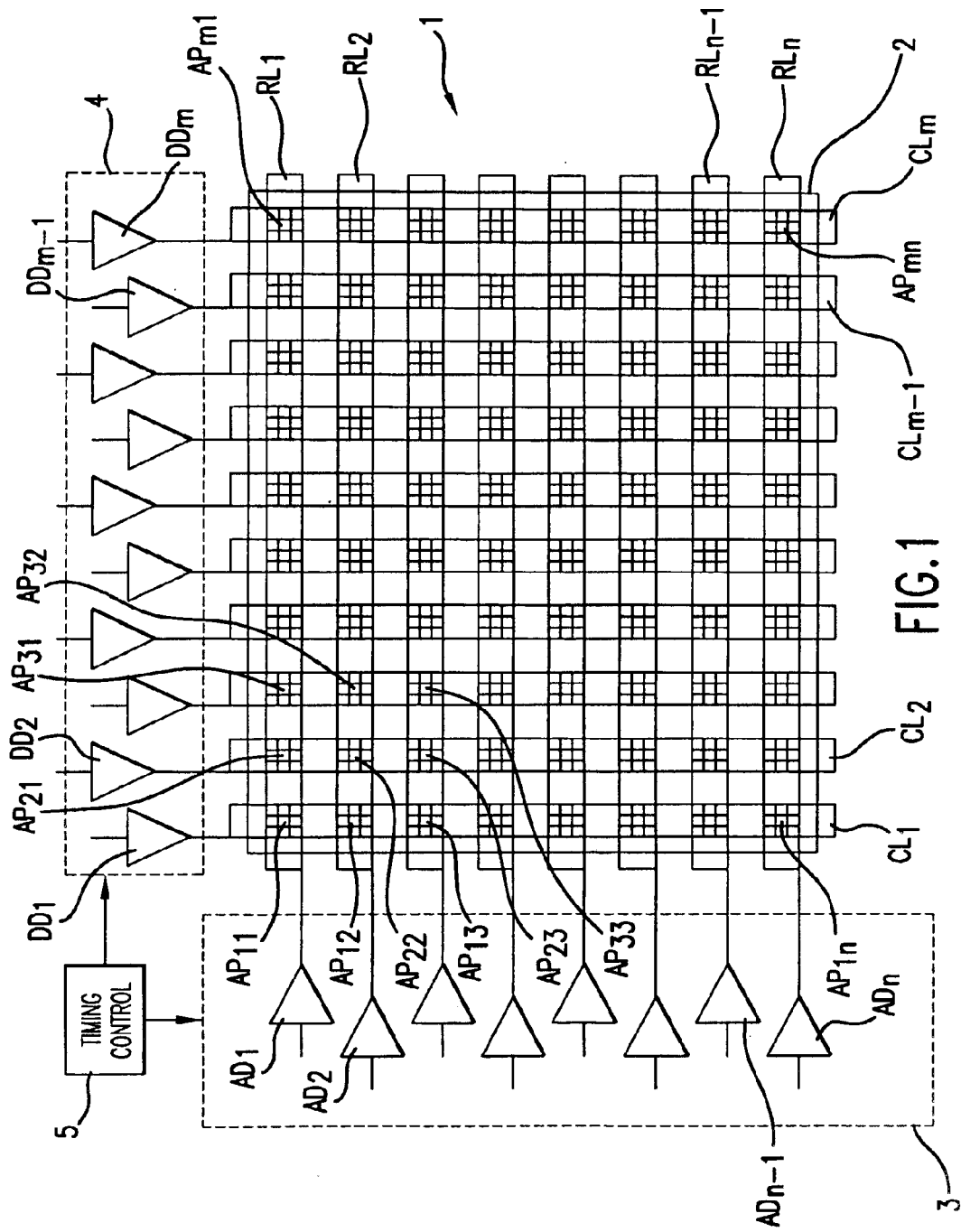
FIG. 1 is a frontal view diagram showing a display surface of a display panel and associated drive circuitry of a display system employing the present invention.

A display system and method for passive displays are provided in accordance with the present invention. The display system may be best described in conjunction with a display system using an RMS-responding liquid crystal display (LCD) depicted in FIG. 1. Referring to FIG. 1, a flat pane.4display system 1 having a display area 2 includes an address driving system 3, a data driving system 4, and an array of display elements $AP_{11}$–$AP_{mn}$ which are preferably mutually spaced apart in predetermined directions. The subscripts indicate the location of each individual display element on the display matrix, that is, the "ith" data electrode and "jth" addressing electrode define the display element $AP_{ij}$. In a preferred embodiment, where there are "n" addressing electrodes, there are "m" data electrodes.

A variety of drivers may be employed as data or address electrode drivers. In a preferred embodiment, address driving system 3 includes a plurality of addressing electrode drivers $AD_1$–$AD_n$. Similarly, data driving system 4 includes a plurality of data electrode drivers $DD_1$–$DD_m$.

To synthesize an image on substantially the entire area of the display surface 2, display system 1 employs a timing controller 5 that coordinates the functions of address driving system 3 and data driving system 4 so that all columns of display elements $AP_{ij}$ of display are addressed row by row in row scan fashion. The application of control signal(s) to the address driving system 3 and data driving system 4 determines its operating mode. Each display element $AP_{ij}$ in the array represents the overlapping of data electrode $CL_i$ and addressing electrode $RL_j$ where, in a preferred embodiment, both electrodes are apertured. For illustration purposes, data electrodes $CL_1$–$CL_m$ are arranged in vertical columns hereinafter referred to as column electrodes and addressing electrodes $RL_1$–$RL_n$ in horizontal rows, hereinafter referred to as row electrodes $RL_1$–$RL_n$. It should be apparent that other electrode patterns are possible that may advantageously use the features of the addressing method to be described.

The display system 1 is shown having a LCD display area 2 preferably comprised of a pair of closely spaced and generally parallel electrically nonconductive and optically transparent substrates. A seal is placed around the substrates to create an enclosed cell and an electro-optic material, such as, nematic liquid crystal material is disposed in the cell gap. The column electrodes are deposited on a major surface of one of the above-described substrates and, similarly, row electrodes are applied on a major surface of the second substrate.

With reference to FIG. 1, column electrodes $CL_1$–$CL_m$ receive information in the form of data signals. Each of row electrodes $RL_1$–$RL_n$ of display 2 receives a periodic time-dependent addressing signal from one of the corresponding associated row drivers $AD_1$–$AD_n$.

A typical known prior art electrode structure for transmissive passive displays with an incident back-light is illustrated in FIG. 2. Referring to FIG. 2, a flat panel display system includes a flat panel display electrode configuration 10; and an array of display elements $PP_{11}$–$PP_{mn}$ which are preferably mutually spaced apart in predetermined locations. Each display element $PP_{ij}$ in the array represents the overlapping of the data electrode $DL_i$ and the addressing electrode $AL_j$. For illustration purposes, data electrodes $DL_1$–$DL_m$ are arranged in vertical columns shall be referred to generally as column electrodes and addressing electrodes $AL_1$–$AL_n$ in horizontal rows and hereinafter referred to as row electrodes $AL_1$–$AL_n$.

With reference to FIG. 2, column electrodes $DL_1$–$DL_m$ receive information in the form of data signals. Each one of row electrodes $AL_1$–$AL_n$ of display electrode configuration 10 receives periodic time-dependent addressing signals from one of the corresponding associated row drivers. Traditionally, known electrode structures include optically transparent and electrically conductive data and addressing electrodes comprised of ITO. The transparency of row and column electrodes allows light to pass between the display elements, which severely degrades image quality and decreases contrast ratio. For example, when display element $PP_{22}$ is addressed, the incident light from the back-light can transmit through the space between the display element $PP_{22}$ and adjacent display elements $PP_{11}$–$PP_{13}$, $PP_{31}$–$PP_{33}$, $PP_{21}$, and $PP_{23}$. To compensate for this optical loss, an additional masking grid (not shown) is generally placed over the display elements.

An electrode structure in a typical display architecture employing liquid crystal material as display media generally is comprised of an optically transparent and electrically conductive material. Most LCD's use a thin transparent electrode structure comprising Indium Tin Oxide (ITO). ITO as a transparent and conductive material which allows the driver electronics of a display device to control the voltage across a display element (pixel or LCD cell). ITO, and similar materials, have limited conductivity and only partial transparency characteristics. Consequently, such materials are problematic in display structures.

FIGS. 3A, 3B, 4A, and 4B illustrate typical electrode structures known in the prior art. Such electrode structures comprise a combination of optically transparent and electrically conductive material(s) and metal(s). Suitable metals include gold, copper and platinum. Along with metal(s), a transparent coating is used, such as a semiconductor metal oxide. Suitable semiconductor oxides include tin oxide, indium oxide and indium tin oxide (ITO).

Referring to FIG. 3A, an exemplar electrode structure 20 of the display device which employs a combination of optically transparent and electrically conductive material 25 and metal 26, 27 on the sides is illustrated. With reference to FIG. 3B, a cross-sectional view of the exemplar electrode structure 20 of FIG. 3A having a thickness "a" and width "$W_1$" is depicted.

Referring to FIG. 4A, another exemplar electrode structure 40 of a display device which employs a combination of optically transparent and electrically conductive material 45 and metal 47 on one of the sides is illustrated. With reference to FIG. 4B, a cross-sectional view of the exemplar electrode structure 40 of FIG. 4A having a thickness "b" and width "$W_2$" is shown.

In accordance with the present invention, the poor conductivity and high sheet resistivity of electrode structures is obviated by employing metal electrodes. In a preferred embodiment of the present invention, the metal electrodes are preferably disposed on an optically transparent substrate which serves to provide structural integrity. In visual displays, a transmittance of greater than 50% is typically desired, with a transmittance of greater than 75% being preferred. A transmittance of greater than 90% is most preferred. Glass and plastic are suitable transparent layers, with plastic being most preferred due to its durability and flexibility and is especially desired for portable products. Suitable plastics include polyethylene, polytetrafluoroethylene, polyester, polyethylene terephthalate and other commercially available materials. Soda glass, boro-silicate glass, ZnS and ZnSe are also suitable optically transparent substrates.

The metal electrode structure is preferably formed on a substrate by such conventional methods as sputtering, chemical vapor deposition (CVD), etching, laser etching, and the like. The metal electrode width is devised such that it does not substantially reduce transparency while insuring uniform rapid charge distribution over a large surface area. The electrode structure may be made of suitable metal, preferably metals having high electrical conductivity. Suitable metals include Al, Au, Ag, Cu, Ir, Ni, Pt, Rh, and Zn. The metals with high conductivity and chemical inertness are preferred. The electrode structure may be patterned in any desired geometry, such as square, rectangular, circular, etc. Those skilled in the art will recognize that electrode patterns described here are adaptable to a variety of formats and densities. Therefore, it should be understood that other configurations of electrode structure are also within the scope of the present invention.

The closely linked issue of optical loss through the electrode structure is handled by devising electrode structures which are apertured at the display elements. In other words, the light attenuation is preferably reduced by providing holes at the electrode overlaps. Since metals are generally approximately 100 times more conductive than metal oxide electrodes, the electrode structure in the present invention could potentially be 100 times smaller in width. This allows for approximately 90% of the electrode structure to have holes for passing light while keeping the conductivity of the electrodes relatively high.

The electrode conductivity is generally characterized by sheet resistivity measured in Ohms per square. For example, for ITO, the resistance is typically larger than 100 Ohms per square. In contrast, for metal electrodes, for example, Aluminum, the resistance is approximately 0.0262 Ohms per square. Consequently, a metal electrode having a sheet resistivity as to ITO one can be approximately 3,817 times narrower and still perform substantially the same function. In other words, such a metal electrode may have significantly smaller width and approximately the same current handling capacity as that of an ITO electrode. Metals with lower resistivity are preferred for increased speed. Further, brittleness often associated with prior art structures is significantly mitigated while yield in the manufacturing process is substantially increased to realize a significant cost reduction.

Generally, thickness of an electrode structure determines conductivity and transparency. Unfortunately, conductivity and transparency of electrode structures are inversely related. If an electrode structure of a display device is semi-transparent, the resulting display is generally of poor quality due to attenuation of optical transmission. Typically, two electrode structures are needed for a display element. Consequently, a significant amount of light is attenuated by light passage through both electrodes. The better conductivity of a thicker electrode structure is achieved at the cost of optical attenuation, while a thinner electrode structure for more light transmission worsens conductivity.

One approach to solve this problem is to arrive at an optimized thickness for the electrode structure. However, an electrode structure with sufficient electrical conductivity and satisfactory optical properties must satisfy competing requirements that result in less than optimal optical and/or electrical properties.

Figure 5:
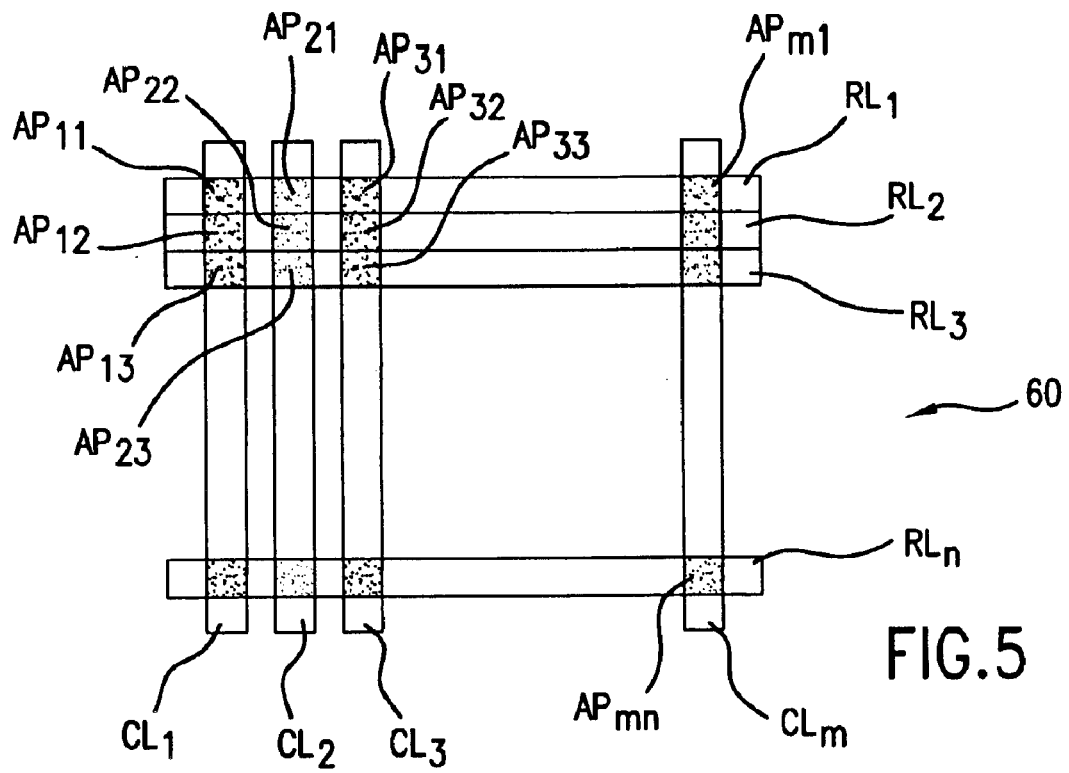
FIG. 5 illustrates a plan view of a preferred embodiment of the electrode structure of a display device which employs electrically conductive (e.g. metal) electrodes in accordance with the present invention.

In FIG. 5, an electrode structure for liquid crystal displays is provided in accordance with a preferred embodiment of the present invention and described in conjunction with a transmissive display system. Referring to FIG. 5, a flat panel display system includes a flat panel display electrode configuration 60 and an array of display elements $AP_{11}$–$AP_{mn}$ preferably mutually spaced apart in predetermined locations. Here again, subscripts indicate the location of each individual display element on the display matrix, that is, "ith" addressing electrode and "jth" data electrode define the display element $AP_{ij}$. In a preferred embodiment, where there are "n" addressing electrodes, there are "m" data electrodes. A variety of drivers may be employed as data or address electrode drivers. Each display element $AP_{ij}$ in the array represents the overlapping of the data electrode $CL_i$ and the addressing electrode $RL_j$. For illustration purposes, data electrodes $CL_1$–$CL_m$ arranged in vertical columns shall be referred to generally as column electrodes and addressing electrodes $RL_1$–$RL_n$ in horizontal rows shall be referred to as row electrodes $RL_1$–$RL_n$. It should be apparent that other electrode patterns are possible that may advantageously use the features of the electrode structure to be described.

With reference to FIG. 5, column electrodes $CL_1$–$CL_m$ receive information in the form of data signals. Each of row electrodes $RL_1$–$RL_n$ of the display electrode configuration 60 receives a periodic time-dependent addressing signal from one of the corresponding associated row drivers, each having a common period, known as frame period. To synthesize an image on substantially the entire display surface area, the display system may employ a control circuit that synchronizes the operations of data drivers and row drivers so that the columns of display elements $AP_{11}$–$AP_{mn}$ of display electrode structure 60 may be addressed row by row.

Typically, activating signals of opposite polarities are applied preferably in alternate frame periods across the LCD material to minimize or reduce the rate of deterioration of the LCD material generally caused by repetitive twisting of liquid crystals in a particular direction. The potential difference across the LCD material can be driven between a positive and negative voltage to generate an RMS (root mean square) voltage.

Preferably, electrode structures of displays, include electrically conductive data and addressing electrodes are comprised of metal(s). The non-transparency of the row and column electrodes of the present invention does not allow light to pass around display elements. This substantially improves image quality and increases contrast ratio. For example, when display element $AP_{22}$ is addressed, the incident light from the back-light cannot transmit through the space between display element $AP_{22}$ and adjacent display elements $AP_{11}$–$AP_{13}$, $AP_{31}$–$AP_{33}$, $AP_{21}$, and $AP_{23}$.

Transparency of metal electrodes at a display element is a function of the aspect ratio of the amount of total metal electrode area to the apertured area of the electrode. Optical attenuation of apertured metal electrodes is primarily dependent on two significant factors. First, the amount of light transmitted is a function of the above described aspect ratio. Second, in the present invention, little light is abated. There is no appreciable loss of light through the non-transparent electrode material compared with prior art semiconductor oxide electrode structures employing semi-transparent ITO. Therefore, light output is simply a function of the aspect ratio of the size and number of apertures in the metal electrode. As a result, the display elements of the non-transparent row and column electrodes are significantly less susceptible to the detrimental effects of light leakage through areas surrounding display elements or pixels, which can severely degrade image quality and decrease contrast ratio.

In this invention, undesired light transmission is controlled by use of non-transparent electrodes having light apertures present where needed. The level of light transmission through a display element is determined by the number and size of apertures. The electrodes of the present invention control unwanted light and allow a higher transmission where light is desired.

Figure 6:
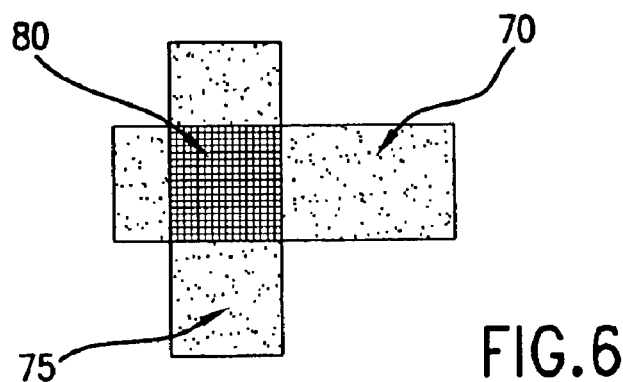
FIG. 6 depicts a plan view of a preferred embodiment of a display element formed at the overlap of apertured electrodes which employ electrically conductive (e.g., metal) electrodes in accordance with the present invention.

FIG. 6 depicts an electrode structure of a preferred embodiment of this invention where the shown exemplary display element is formed at the overlap of the apertured row and column electrodes of the display device which employs non-transparent electrically conductive (e.g., metal) electrodes. At each display element, the horizontal electrode 70 and the vertical electrode 75 are each formed with a porous region 80. The porous regions 80 of the electrodes 70, 75 each contain a plurality of apertures. The porous regions 80 overlap at each display element. In the illustrated embodiment, the apertures of each porous region 80 are formed by a grid of the metal forming the metal electrodes 70, 75.

Figure 7:
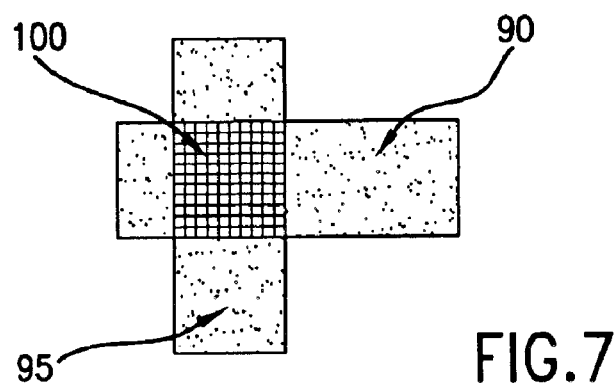
FIG. 7 depicts a plan view of another preferred embodiment of a display element formed at the overlap of apertured electrodes of a display device which employs electrically conductive (e.g. metal) electrodes in accordance with the present invention.

FIG. 7 depicts another electrode structure of a preferred embodiment of the present invention where the shown exemplary display element is formed at the overlap of the apertured row and column electrodes 90, 95 of the display device which employs non-transparent electrically conductive (e.g. metal) electrodes. The amount of light transmitted is proportional to the size of the perforations or mesh and the number of apertures at the display element location. The electrode structure of FIG. 7 has relatively fewer apertures at the porous region 100 than does the porous region 80 of the structure in FIG. 6. As shown in FIG. 7, the grid elements forming the porous region 100 are thicker than the grid elements forming the porous region 80 of the embodiment shown in FIG. 6. The total area of the apertures in the porous region 80 of the embodiment of FIG. 6 is larger than the total area of the apertures in the porous region 100 of the embodiment of FIG. 7, so that more light passes through the region 80 than through the region 100.

In accordance with the present invention, the use of apertured metal electrodes including meshed, porous, and perforated structures provides electrical conduction through the electrode structure and make improved larger displays feasible. The apertured metal electrode structures attenuate light where row and column electrodes do not overlap, to result in increased display contrast ratio. Moreover, a metal electrode structure generally reduces the capacitance of the display element by a substantial reduction in display element dimensions. Consequently, display elements charge and discharge more quickly and consume substantially less power.

The metal electrodes of the present invention lower electrical sheet resistivity in electrode structures to meet the current carrying requirements of relatively large displays. The selectively apertured non-transparent electrode structure, preferably of metal, provides sufficient electrical conductivity. Consequently, display electrode structure thickness and width is significantly reduced. Furthermore, transparency (except for optical transmission at display element locations) of the electrode structure combined with relatively smaller display element capacitance due to reduction of display element size, provides significantly lower response time and substantially improved contrast ratio.

The poor contrast ratio performance of passive LCD structures is significantly improved by the electrode structure architecture of the present invention. Typically, adverse optical effects in adjoining display elements, while a display element is addressed contribute to the deterioration of visual contrast of a display. Additionally, contrast enchancing signal regulation schemes, such as those disclosed in other pending applications assigned to the present inventor, may be employed to achieve enhanced contrast ratios with the present invention. The electrode structure of the present invention provides lower capacitance resulting in a more complete ON or OFF state as well as gray scale-based state for each display element by controlled optical transmission. Consequently, display contrast ratio is significantly improved.

As those skilled in the art will recognize, a variety of displays other than passive LCD may be devised to utilize the electrode structure of the present invention. For example, in an alternate embodiment of the present invention, a PDLC (polymer dispersed liquid crystal) display system is employed in which between electrode and common plane substrates (as disclosed in a co-pending patent application assigned to the assignee of the present invention), a PDLC film comprising a liquid crystal mixture forming microdroplets in an optically isotropic, transparent polymer matrix, is placed. One of the refractive indices of the liquid crystal mixture is matched to the refractive index of the polymer matrix, the transmission of which can be varied by applying an electrical voltage.

The embodiments described above are merely illustrative and skilled persons can make variations on them without departing from the scope of the invention, which is defined by the following claims.

I claim:

1. An image display structure comprising:

first and second parallel opposing substrates;

a plurality of first electrically conducting electrodes on the first substrate, the first conducting electrodes having a plurality of apertures;

a plurality of second electrically conducting electrodes on the second substrate, the second conducting electrodes having a plurality of apertures;

wherein the conducting electrodes are arranged so that the apertures of the first conducting electrodes overlap with, and are directly aligned with, the apertures of the second conducting electrodes;

display media disposed between the first substrate and the second substrate, wherein the light transmissivity of the display media varies in response to an applied electrical field wherein the apertures of the first and second conducting electrodes are metal mesh, and located where the first and second conducting elements overlap; and wherein the first and second conducting electrodes are each formed of substantially visually opaque metal where the electrodes do not overlap to form the image locations.

2. The image display structure of claim 1, wherein the first and second substrates are optically transparent.

3. The image display structure of claim 1, wherein the first and second substrates are glass.

4. The image display structure of claim 1, wherein the first and second substrates are plastic.

5. The image display structure of claim 1, wherein:
   the first electrodes are row electrodes;
   the second electrodes are column electrodes; and
   the first and second electrodes are substantially perpendicular one another.

6. An apparatus for displaying patterns, the apparatus comprising:

a first substrate bearing a plurality of first electrodes;

a second substrate bearing a plurality of second electrodes;

wherein portions of the first electrodes overlap portions of the second electrodes to form a plurality of image locations, with each image location being formed by the overlap of corresponding first and second electrodes, and at each image location, the first and second electrodes each have a plurality of openings through the electrode, with the openings of the first electrodes being directly aligned with the openings of the second electrodes;

a display media having selective transmissivity in response to applied electrical bias, the display media being constrained between the first substrate and the second substrate;

a plurality of first drivers connected to the first electrodes to selectively apply first signals to the first electrodes;

a plurality of second drivers connected to the second electrodes to selectively apply second signals to the second electrodes;

wherein the opening of the first and second conducting electrodes are metal mesh, and are located where the first and second conducting elements overlap; and wherein the first and second conducting electrodes are each formed of substantially visually opaque metal where the electrodes do not overlap to form the image locations.

7. The image display structure of claim 6, wherein the first and second substrates are optically transparent.

8. The image display structure of claim 7, wherein the first and second major substrates are glass.

9. The image display structure of claim 7, wherein the first and second substrates are plastic.

10. The image display structure of claim 6, wherein:
    the first electrodes are row electrodes;
    the second electrodes are column electrodes; and
    the first and second electrodes are substantially perpendicular one another.

11. The image display structure of claim 6, additionally comprising a timing controller operably connected to the second drivers to control application of the second signal to a selected second electrode and application of the first signals to a selected first electrode to apply a first electrical bias across the image location corresponding to the overlap of the selected first electrode and the selected second electrode to modify the transmissivity of the display media of the image location formed by the overlap of the selected first electrode and the selected second electrode.

* * * * *